US005455063A

United States Patent [19]
Jo

[11] Patent Number: 5,455,063
[45] Date of Patent: Oct. 3, 1995

[54] METHOD FOR FORMING CONDUCTIVE FILM

[75] Inventor: Seung Y. Jo, Kumi, Rep. of Korea

[73] Assignee: Goldstar Co., Ltd., Seoul, Rep. of Korea

[21] Appl. No.: 977,011

[22] Filed: Nov. 16, 1992

[30] Foreign Application Priority Data

Nov. 26, 1991 [KR] Rep. of Korea ............... 21313/1991

[51] Int. Cl.$^6$ .................................................. B05D 1/02
[52] U.S. Cl. ................................... 427/64; 427/421
[58] Field of Search ................... 427/64, 421; 118/323

[56] References Cited

U.S. PATENT DOCUMENTS 1,835,402 12/1931 Juers ........................................ 118/323
1,929,896 10/1933 Merrit et al. ............................ 118/323
2,246,502 6/1941 Bramsen et al. ....................... 118/323
4,729,907 3/1988 Deal et al. .............................. 427/421
5,110,632 5/1992 Kawaguchi et al. .................... 118/323

*Primary Examiner*—Shrive Beck
*Assistant Examiner*—Brian K. Talbot
*Attorney, Agent, or Firm*—Fish & Richardson

[57] ABSTRACT

A method for uniformly coating a conductive film on a panel surface is disclosed. The conductive film is applied to the panel surface by spraying a coating material through a moving nozzle in zig-zag, crosswise and perpendicular to crosswise paths. There is no area on the panel surface at which the nozzle paths cross. As a result, the coated film on the panel surface has a uniform thickness, and electric surface resistance and brightness is improved.

3 Claims, 2 Drawing Sheets

METHOD FOR FORMING CONDUCTIVE FILM

BACKGROUND OF THE INVENTION

1. Field of the Invention

The present invention relates to a method for uniformly coating a conductive film on a panel surface. The invention is particularly advantageous in providing an electrically conductive film on the panel surface of a cathode ray tube.

2. Description of the Prior Art

Generally, cathode ray tubes and liquid crystal displays have a front panel made of an insulating material such as glass or plastic. As a result, an electrostatic force occurs at the surface of front panel, thereby attracting dust to the surface. In particular, when such an electrostatic force occurs at the front surface of a cathode ray tube in a television receiver or in other electric displays, it may cause the displays to malfunction. In severe cases, the displays may be permanently damaged.

In order to solve these problems, various methods have been proposed for providing a cathode ray tube having an electrically conductive surface, thereby preventing the cathode ray tube from being electrostatically charged. Among these methods, is a method for coating a metal film or a conductive glass oxide film on the surface of a cathode ray tube using a deposition technique or other techniques.

A method of forming a conductive film on the surface of a cathode ray tube is disclosed in Japanese Patent Laid-open Publication No. 100943/1982. This method includes the following steps:

a) cleaning a front panel of the cathode ray tube with an abrasive and a cleaning agent;

b) pre-heating the surface of the front panel in a furnace to a temperature of about 60° C. and then coating a liquid conductive film-forming coating material over the panel surface using a spray nozzle (such a coating material is disclosed in PCT Publication No. WO 88/06331 published on Aug. 25, 1988); and c) baking the coating material on the panel surface in a furnace at a temperature of about 150° C. for about 30 minutes, so as to crystalize the coating material.

The film obtained by crystallizing the coating material on the panel surface provides desirable characteristics such as electric surface resistance, brightness, roughness and film strength.

Accordingly, to uniformly coat the coating material over the panel surface of cathode ray tube is a very important factor in obtaining desirable panel surface characteristics in a cathode ray tube.

Generally, coating the coating material over the panel surface of a cathode ray tube is carried out, not manually, but automatically by moving a nozzle along a predetermined path using an automatic device such as a robot. A conventional method for coating a coating material over the panel surface of a cathode ray tube is carried out according to the procedures illustrated in FIG. 1.

In accordance with the conventional method, a spray nozzle moves from a point X to a point Y in a zig-zag manner along a path on a cathode ray tube panel 1. From the point Y, the spray nozzle then moves to the original point X in a zig-zag manner along a path crossing the previous path. As the spray nozzle moves along its path, a coating material is spread over the panel surface of the cathode ray tube at an inclined angle of travel.

The spray nozzle travels from the point X to the point Y along a path as indicated by the solid line in FIG. 1. The nozzle then returns to the point X along a path indicated by the dotted line in FIG. 1. The nozzle is held in a vertical position and moves along the curvature of the panel surface during spraying, as indicated by the arrows in FIG. 2.

In the conventional method, however, the thickness of the coating material becomes irregular throughout the panel surface of the cathode ray tube, since the nozzle coats the coating material while moving along at an inclined angle of travel. The coated film is relatively thick at areas "A" where the inclined travel paths cross each other, and the amount of coating material coated at the areas "A" is considered to be excessive. The areas "B", which correspond to portions of the inclined travel paths in which there was no crossover, are relatively thin. This irregular coating thickness forms surface irregularities which result in irregularity of electric surface resistance and brightness at both areas A and B.

Table 1 shows electric surface resistance and brightness measured at areas A and B.

TABLE 1

|  | Area "A" | Area "B" |
| --- | --- | --- |
| Electric Surface Resistance (Ω/sq) | $6.16 \times 10^{10}$ | $2.0 \times 10^{10}$ |
| Brightness (%) | 56 | 67 |

Since the nozzle sprays the coating material in a downward vertical direction as it moves along the curvature of the cathode ray tube, there is a difference in the distances between the nozzle and each panel surface portion located within the spraying area of the nozzle. For example, portions P1–P3 of panel surface shown in FIG. 2 have different distances from the nozzle, i.e., L1–L3, respectively. Such difference in distances becomes a factor in the irregularity of coating thickness.

SUMMARY OF THE INVENTION

An object of the invention is to eliminate the above-mentioned problems encountered in the prior art and to provide a method for forming a conductive film on a panel surface. The method is capable of achieving a conductive film that is uniform in thickness by minimizing the difference in the distances between a spraying nozzle and each panel surface portion located within the overall spraying area of the nozzle.

In accordance with the present invention, this object can be accomplished by providing a method for forming a conductive film on a panel surface by spraying a coating material through a moving nozzle comprising moving the nozzle along a primary path in a zig-zag manner from a first point located outwardly of the panel surface by moving the nozzle in sequential crosswise and perpendicular tracks along the primary path to a second point located outwardly of the panel surface and opposite to the first point, and moving the nozzle along a secondary path in a zig-zag manner from the second point to the first point by moving the nozzle sequentially in crosswise and perpendicular to crosswise tracks along the secondary path, wherein each crosswise track of the secondary path is between adjacent crosswise tracks of the primary path, and the perpendicular to crosswise tracks of the primary and secondary paths are located outwardly of the panel surface. In a preferred embodiment of the invention, the nozzle is maintained normal to the curvature of the panel surface during movement along the primary and secondary paths.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT(S)

Figure 3:
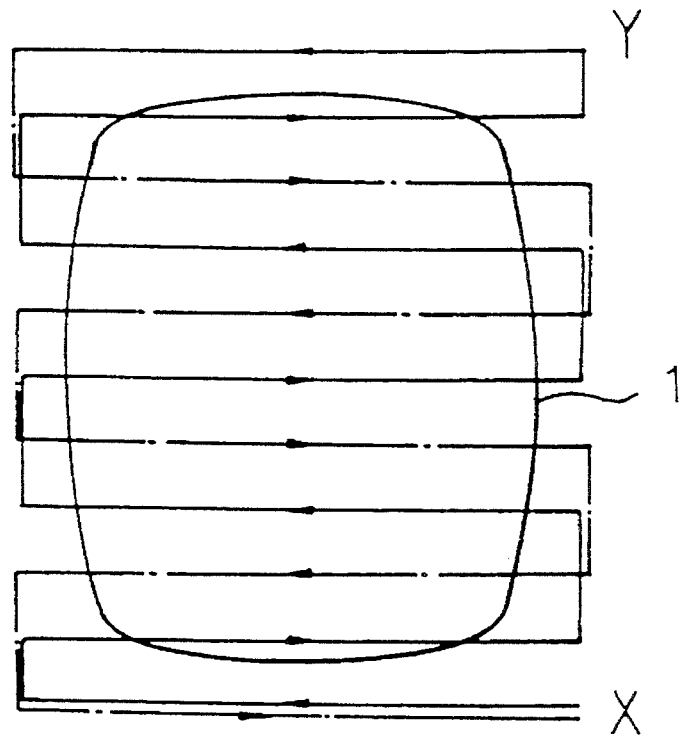
FIG. 3 is a schematic view illustrating a travel path of a spray nozzle according to the present invention.

FIG. 3 is a schematic view illustrating the travel path of a nozzle according to the present invention. As shown in FIG. 3, the nozzle moves from point X to point Y in a zig-zag manner along a path, sequentially alternating in crosswise and perpendicular to crosswise directions. From the point Y, the nozzle returns to the point X in a zig-zag manner along another path, also sequentially alternating in the horizontal and vertical directions. In accordance with the present invention, each crosswise path of the return movement is between adjacent crosswise paths from the initial movement from point X to point Y. The perpendicular to crosswise path traveled during the return movement partially overlaps with each corresponding perpendicular to crosswise path from the initial movement from point X to point Y.

The spray nozzle sprays a coating material over the panel surface according to a normal travel method wherein the spray nozzle travels from point X to the point Y along a path indicated by the solid line in FIG. 3, and then returns to point X along a path indicated by the dotted line in FIG. 3. There is no area on the panel surface at which the nozzle path crosses. As a result, it is possible to improve electric surface resistance and brightness, since the coated film on the panel surface has a uniform thickness.

Figure 4A:
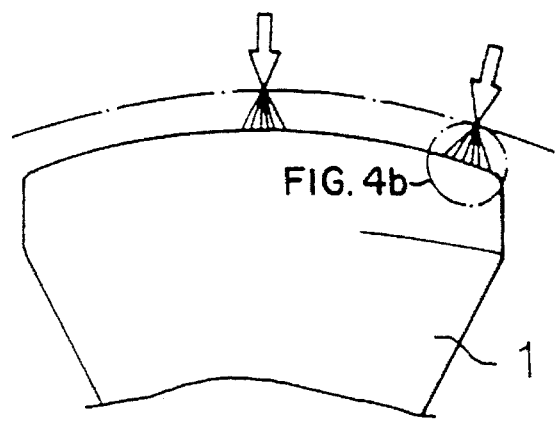
FIG. 4 is a schematic view illustrating spraying a coating material from a spray nozzle onto a panel surface, according to the present invention.
Figure 4B:
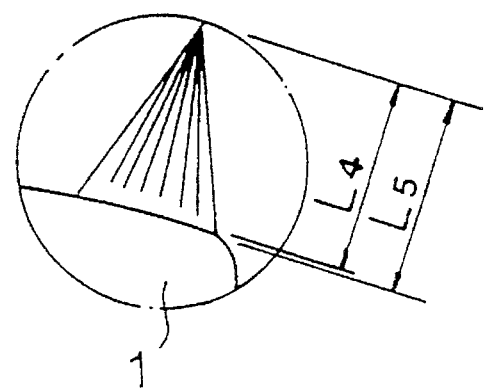

In a preferred embodiment of the invention, the nozzle is maintained normal to the curvature of the panel surface of a cathode ray tube during movement along the entire spray path, as indicated by the arrows in FIG. 4. Accordingly, the difference in the distances between the nozzle and each portion of the panel surface being sprayed by the nozzle is minimized, as shown by the distances L4 and L5 in FIG. 4. The result is that the thickness of the film coating at the peripheral panel surface portions is approximately the same as the thickness of the film coating at the center panel surface portions. There is, therefore, an improvement in surface roughness.

Figure 1:
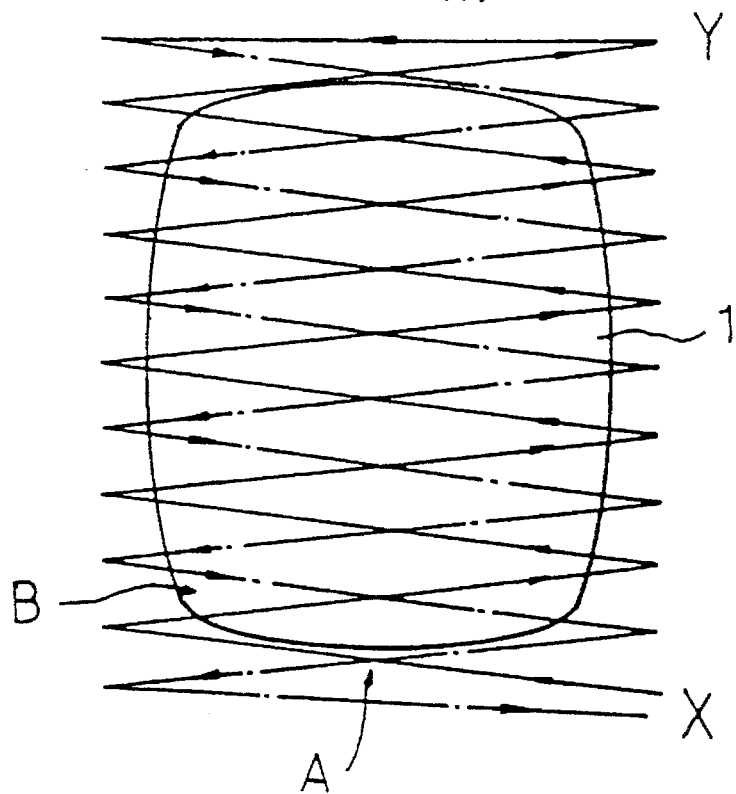
FIG. 1 is a schematic view illustrating a travel path of a spray nozzle according to the prior art.
Figure 2A:
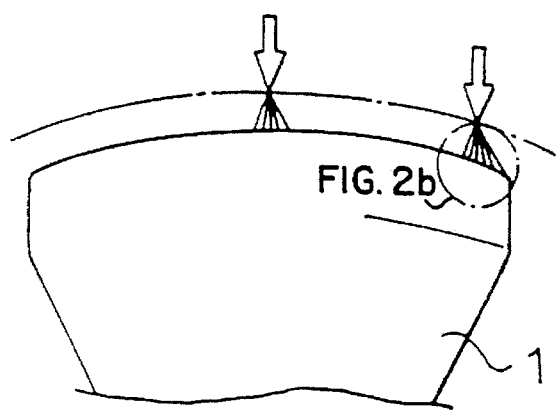
FIG. 2 is a schematic view illustrating spraying a coating material from a spray nozzle onto a panel surface, according to the prior art.
Figure 2B:
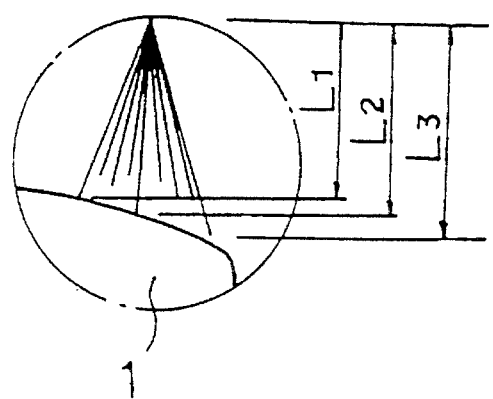

Table 2 shows electric surface resistance and brightness at a center portion and a peripheral portion of the coated film according to the present invention. The measured areas correspond to the areas A and B of FIG. 1, respectively.

TABLE 2

|  | Center Portion | Peripheral Portion |
|---|---|---|
| Electric Surface Resistance ($\Omega$/sq) | $5.71 \times 10^9$ | $6.22 \times 10^9$ |
| Brightness (%) | 57 | 59 |

Although the method of the present invention has been described as being applied to cathode ray tubes in the illustrated preferred embodiment, it may be widely applied to various devices requiring a coated film formed on a transparent substrate made of glass or plastic.

As apparent from the above description, the present invention provides a method for forming a conductive film on a panel surface, which is capable of providing a uniform electric surface resistance across the entire panel surface, thereby reducing the time required for removing electrostatic forces. The conductive film formed according to the method also shields the panel surface from external light effectively, providing uniform brightness. Thus, there is an improvement in the quality of coated products.

Although the preferred embodiments of the invention have been disclosed for illustrative purpose, those skilled in the art will appreciate that various modifications, additions and substitutions are possible, without departing from the scope and spirit of the invention as described in the accompanying claims.

What is claimed is:

1. A method for forming a conductive film on a panel surface by spraying a coating material through a moving nozzle comprising moving the nozzle along a primary path in a zig-zag manner from a first point located outwardly of the panel surface by moving the nozzle in sequential crosswise and perpendicular to crosswise tracks along the primary path to a second point located outwardly of the panel surface and opposite to the first point, and moving the nozzle along a secondary path in a zig-zag manner from the second point to the first point by moving the nozzle sequentially in crosswise and perpendicular to crosswise track along the secondary path, wherein each crosswise track of the secondary path is between adjacent crosswise tracks of the primary path and the perpendicular to crosswise tracks of the primary and secondary paths are located outwardly of the panel surface, and wherein there is no crossing of the primary path and the secondary path over the panel surface and there is essentially no overlapping of the primary and secondary spray paths.

2. A method in accordance with claim 1, wherein the panel surface is curved and the nozzle is maintained normal to the curvature of the panel surface during movement along the primary and secondary paths.

3. A method in accordance with claim 1, wherein the panel surface is a panel surface of a cathode ray tube.

* * * * *